Oct. 25, 1938.  V. W. KLIESRATH  2,134,520
CLUTCH CONTROL MECHANISM
Filed May 17, 1934
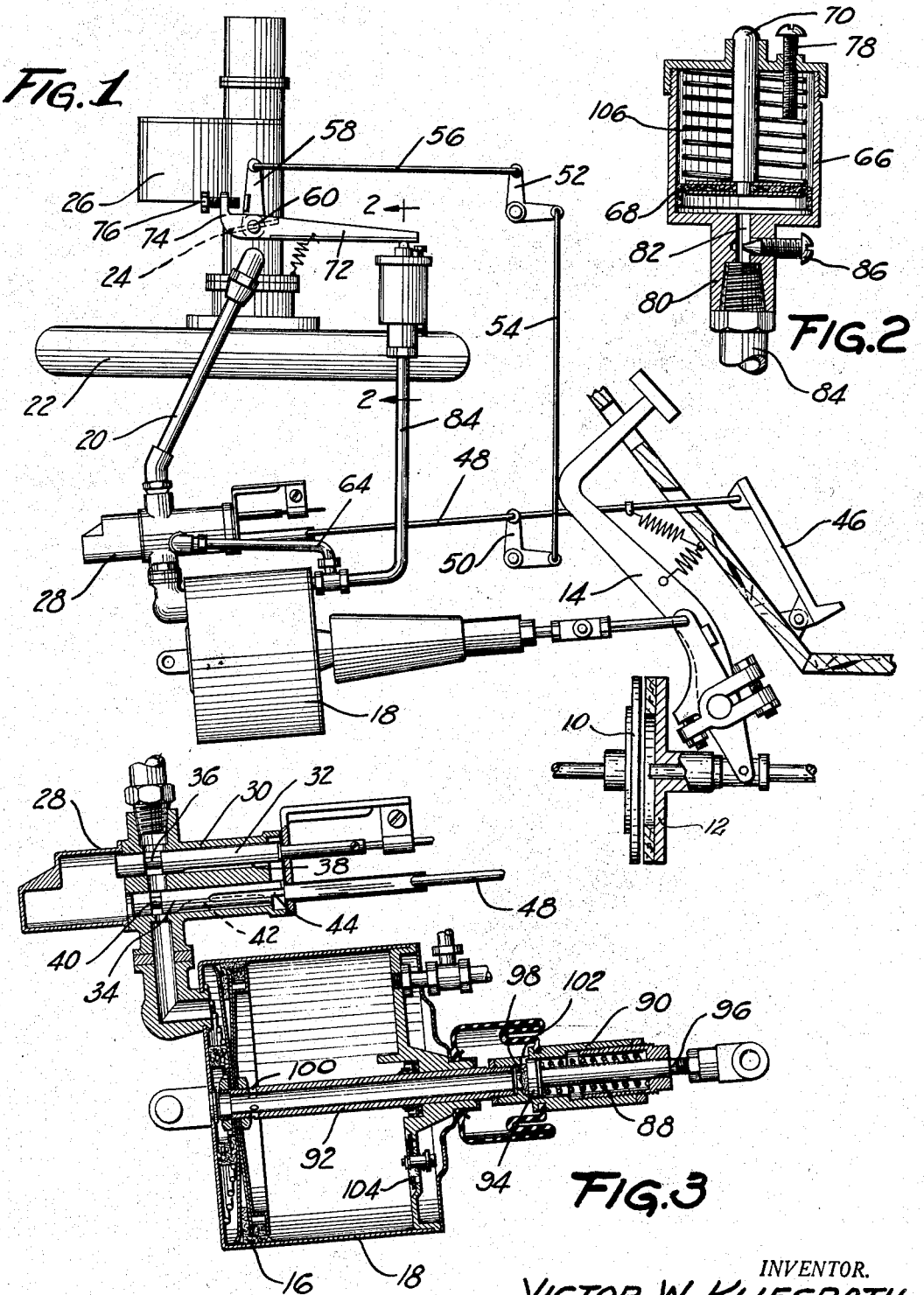
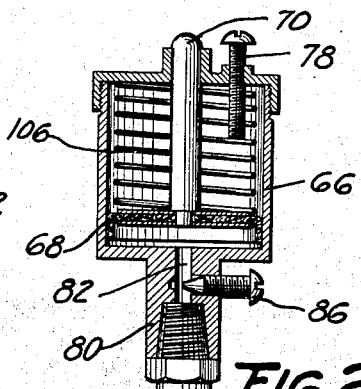
INVENTOR.
VICTOR W. KLIESRATH
BY
ATTORNEY Patented Oct. 25, 1938

2,134,520

UNITED STATES PATENT OFFICE 2,134,520

CLUTCH CONTROL MECHANISM

Victor W. Kliesrath, South Bend, Ind., assignor to Bendix Aviation Corporation, South Bend, Ind., a corporation of Delaware Application May 17, 1934, Serial No. 726,048

12 Claims. (Cl. 192—.01)

This invention relates in general to clutch operators, and more particularly to power means, controlled by the accelerator, for so disengaging and engaging the clutch as to simulate a conventional manual operation thereof.

The mechanisms of this character disclosed in the prior art, and acknowledged hereinafter, provide power means automatically operable to engage the clutch in two stages of movement, the first stage being relatively fast, terminating when the clutch plates contact at a predetermined load, and the second stage being relatively slow to effect the desired acceleration of the vehicle. It often happens, however, that the engine is delivering insufficient torque when the clutch plates are first loaded, resulting in a jerking of the clutch and a possible stalling of the engine. The instant invention is accordingly designed to obviate these objectionable features.

To this end there is provided means, operable by the clutch as a prime mover, for automatically opening the throttle immediately after the clutch plates are first loaded, thus insuring sufficient torque of the driving clutch plate to obviate a jerking clutch and resulting in a smooth start of the vehicle.

A further object of the invention is to provide power means for controlling the operation of the clutch whereby the same is engaged relatively rapidly until the clutch plates contact, whereupon the engagement is cushioned by means acting to store up potential energy. In one embodiment of the invention there is provided an air trap which is also designed to function as an anti-stall means by opening the throttle.

Yet another object of the invention is to provide means for automatically opening the throttle by pneumatically operable means controlled by the clutch, said means being operative at the most desirable time; that is, just as the clutch plates are loaded prior to completing the engagement of the clutch.

A further object of the invention is to provide means, controlled by the accelerator, for both controlling the engagement of the clutch and the operation of the throttle in such manner as to insure a smooth start of the vehicle and also facilitate the maneuvering of the vehicle in parking.

Other objects of the invention and desirable details of construction and combinations of parts will become apparent from the following description of a preferred embodiment, which description is taken in conjunction with the accompanying drawing, in which:

Figure 1 is a diagrammatic layout of the clutch and throttle controlling mechanism constituting the invention;

Figure 2 is a sectional view taken on line 2—2 of Figure 1 and disclosing the power means for operating the throttle; and Figure 3 is a longitudinal sectional view of a portion of the power means, which, taken with the mechanism of Figure 2, controls the operation of the clutch.

In that embodiment of the invention selected for illustration, there is disclosed in Figure 1 a conventional clutch comprising driving and driven plates 10 and 12, the driven plate being operatively connected to a conventional clutch pedal 14 and to a piston 16 reciprocable within a cylinder 18, the two constituting a pressure differential operated motor. Details of the connection between the piston and the clutch are described hereinafter: however, the same are not claimed herein, inasmuch as the same constitute the invention of O. K. Kelley, application No. 622,998, filed July 16, 1932.

The clutch operating motor is adapted to be energized by evacuating the same. To this end the cylinder 18 is connected, by a conduit 20, to the induction passage of an internal-combustion engine, the conduit being tapped into the passage between a manifold 22 leading to the engine pistons and a throttle valve 24 of a down-draft carburetor 26.

A combined three-way, bleed and cut-out valvular unit 28 is incorporated in the conduit 20, the same, however, constituting no part of the instant invention, being that of Victor W. Kliesrath, disclosed, described and claimed in application No. 592,170, filed February 10, 1932. Briefly described, the valve unit comprises a casing 30 having parallel bores receiving reciprocable plungers 32 and 34. Plunger 32 serves as a cut-out valve, operable from the dash by a Bowden control, not shown, and comprises a recessed portion 36 and a vent slot 38. Plunger 34 constitutes a combined three-way and bleed valve and comprises a recess 40 and vent and bleed slots 42 and 44 respectively, the plunger 34 being operatively connected to an accelerator pedal 46 by a link 48, the latter also being connected by bell cranks 50 and 52 and links 54 and 56 to a crank 58, loosely mounted on a shaft 60 to which the throttle valve 24 is fixedly connected. The bleed slot 44 in the plunger 34 is adapted to register with a port in the valve casing, not shown, said port being connected to the cylinder 18 by a conduit 64.

The invention is particularly directed to a combined clutch and throttle control device and comprises a cylinder member 66, Figure 2, housing a reciprocable piston element 68, the latter having connected thereto a plunger 70 slidable through one end wall of the cylinder and adapted at its end to contact a lever member 72, fixedly mounted between its ends to the throttle shaft 60. The lever is provided at one end with an upturned portion 74 receiving an adjustable stop member 76, the latter adapted to be contacted, after a degree of lost motion, by the accelerator operated crank 58. An adjustable stop member 78 is mounted in the cylinder 66 to predetermine the limit of movement of the piston 68. The cylinder 66 in its lower end wall is provided with a boss 80 having a bore 82 interconnecting the interior of the cylinder and a conduit 84, the latter being connected at one end to the boss and at its other end to the cylinder 18. A set screw 86, having a tapered end, is mounted in the boss 80 and serves to determine the rate of flow of air through the bore 82.

Referring now to the operation of the above-described mechanism, with the engine idling and the accelerator completely released, the clutch motor is evacuated to disengage the clutch, the motor piston 16 moving to the position disclosed in Figure 3; this by virtue of the communication between the rarefied manifold via conduit 20 and valve 28. In moving to its clutch disengaged position the piston first compresses a spring 88, housed within a two-part casing 90 adjustably secured to a hollow connecting rod 92. The spring 88 is interposed between one end of the casing 90 and a valve member 94, the latter constituting one end of a rod 96 connected to the clutch. Upon compression of the spring 88, which is weaker than the clutch springs, the valve 94 is moved from a seat 98, thereby providing communication between the interior of the cylinder 18 and the atmosphere via openings 100 in the rod 92, the bore thereof and openings 102 in the casing 90. After the spring goes solid, further movement of the piston, of course, serves to disengage the clutch. An inwardly opening check valve 104 in the right end wall of the cylinder 18 insures this clutch disengaging movement of the piston.

When it is desired to reengage the clutch, the accelerator is depressed, thereby moving the plunger 34 to the left, Figure 3, cutting off the connection between the manifold and the clutch motor and venting the latter to the atmosphere via the slot 42. The motor piston 16 then moves relatively rapidly to the right by virtue of the rapid efflux of air from the cylinder 18 via the open valve 94. When the clutch plates contact at a predetermined load, determined by the adjustment of the spring 88, the valve 94 automatically closes, all as is fully described in the aforementioned application of O. K. Kelley, whereupon the engagement of the clutch is automatically retarded. The engagement is then completed by virtue of the cushioning effect of the piston 68, Figure 2, as it is moved upwardly, the rod 70 contacting the lever 72 to open the throttle, the distinguishing feature of the invention being that the throttle is automatically opened just at the most needed time, thereby preventing a stall of the engine and insuring a smooth start of the vehicle. The adjustable stop 78 determines the extent of such automatic throttle opening, and the valve member 86, by its adjustment, determines the rate of such opening. This action is, of course, effected by the air forced from the clutch operating motor by the clutch springs into the cylinder 66 via the conduit 84, the cylinder 66 and piston 68 acting in a measure both as an air pump and as a dashpot in controlling the engagement of the clutch and operation of the throttle.

Such a device has utility, inasmuch as it often happens that in maneuvering the car in parking the driver does not open the throttle sufficiently to provide adequate torque of the driving clutch plate. As a result the car will jerk and the engine stall; this by virtue of the fact that there is insufficient engine torque to complete the engagement of the clutch, the car picking up the engine as a load. The above-described device, however, obviates this effect by automatically opening the throttle and increasing the motor torque just as the clutch plates are contacting.

It is to be noted that the cylinder and piston mechanism of Figure 2 also provide a means for cushioning the engagement of the clutch, and this effect may be further controlled by the placing of a spring 106 between the upper end wall of the cylinder 66 and the piston 68.

Preferably, the parts are so arranged that the valve plunger 34 is operated to initiate the engagement of the clutch before the loosely mounted crank 58 contacts the stop 76 of the throttle operating lever 72 and also before the bleed slot 44, which is preferably tapered, registers with the port 62. Thus the entire cushioning of the clutch is effected by the throttle opening air trap mechanism of Figure 2. However, the parts may be arranged to only partly complete the engagement of the clutch by said mechanism, thus insuring a slipping clutch at a predetermined maximum loading of the clutch plates and effecting a smooth start of the car. With further depression of the accelerator the trapped air in the cylinder 66 is vented via the tapered slot 44, the rate of engagement of the clutch being determined by the degree of depression of the accelerator to progressively register the slot with the port 62. There are thus provided two pneumatic means branched off from the cylinder 18 in parallel and either or both together acting to control the engagement of the clutch, depending upon the adjustment of the parts.

When it is desired to render the clutch and throttle controlling mechanism inoperative, the cut-off valve plunger 32 is moved to the left, Figure 3, by the Bowden control, thus permanently venting the cylinder 18 to the atmosphere via the slot 38.

While one illustrative embodiment has been described, it is not my intention to limit the scope of the invention to that particular embodiment, or otherwise than by the terms of the appended claims.

I claim:

1. In an automotive vehicle provided with a clutch, an accelerator and a throttle, means for operating the throttle, power means for operating the clutch, said power means comprising automatically operable valve means controlled by the clutch, which, together with the accelerator, function to control the operation of the throttle through the intermediary of said throttle operating means.

2. In an automotive vehicle provided with a throttle, an accelerator and a clutch, means for operating the throttle, pressure differential operated clutch controlling means, said latter means comprising means operative, partly through the intermediary of said throttle operating means, to both control the engagement of the clutch and open the throttle, and accelerator operated valve means for initiating the clutch disengaging and engaging operations of said pressure differential operated means.

3. In an automotive vehicle provided with a clutch and an accelerator, pressure differential operated power means for operating the clutch, accelerator operated control means for said power means operative to initiate the clutch disengaging and engaging operations of said power means, said power means comprising a pump operative to cushion the engagement of the clutch.

4. In an automotive vehicle provided with a clutch and an accelerator, pressure differential operated power means for operating the clutch, accelerator operated control means for said power means operative to initiate the clutch disengaging and engaging operations of said power means, said power means comprising means for effecting a relatively rapid initial rate of clutch engagement, and further comprising means for accumulating potential energy and in so doing effecting a relatively slow final rate of clutch engagement.

5. In an automotive vehicle provided with a clutch, power means for operating the clutch, valve means for initiating the clutch disengaging and engaging operations of said power means, said power means comprising valve means, operative when the clutch is engaged at a predetermined load, to slow up the engagement of the clutch, said power means further comprising an air cushioning means operative to effect a relatively slow clutch movement to complete the engagement thereof.

6. In an automotive vehicle provided with a clutch and an accelerator, pressure differential operated power means for controlling the operation of the clutch, said power means comprising a valve operated by the accelerator for initiating the clutch disengaging and engaging operations of the power means, and further comprising bleed valve means and an air cushion for controlling the clutch engaging operation of said power means, said bleed valve means being operated partly by the clutch and partly by the accelerator.

7. In an automotive vehicle provided with a throttle, an accelerator and a clutch, power means for controlling the operation of the clutch and in part controlling the operation of the throttle, said power means comprising valve means operable to initiate the clutch disengaging and engaging operations of said power means, means interconnecting said throttle, accelerator and valve, said means comprising a lost motion connection with the throttle whereby the aforementioned valve is operated to effect an engagement and disengagement of the clutch before and after the throttle is opened and closed respectively, said power means further comprising means, rendered operative when the clutch is being engaged and before the throttle is opened by the accelerator, for synchronously controlling the engagement of the clutch and opening the throttle to facilitate said engagement, said last mentioned means being further operative, after the clutch is engaged, to aid in a subsequent disengagement of the clutch.

8. In an automotive vehicle provided with a throttle, an accelerator and a clutch, power means for controlling the operation of the clutch and in part controlling the operation of the throttle, said means comprising accelerator operated valve means for in part controlling the operation of said power means, and further comprising pneumatically operated means operative to jointly control the clutch engaging operation of said power means and the opening of the throttle.

9. In an automotive vehicle provided with a throttle and a clutch, means for operating the throttle, power means for controlling the operation of the clutch, said latter means including valve means operated by the clutch springs and operative to in part control said throttle operating means to open the throttle as the clutch is being engaged.

10. In an automotive vehicle provided with a throttle and a clutch having driving and driven members, means for operating the throttle, power means for controlling the operation of the clutch including a pressure differential operated motor, said latter means comprising means, together with the remainder of the power means, so constructed and arranged as to be operable, when the gaseous pressure within a compartment of the motor reaches a predetermined factor, to actuate said throttle operating mechanism to open the throttle.

11. In an automotive vehicle provided with a throttle and a clutch having driving and driven members, means operating the throttle, power means for controlling the operation of the clutch including a pressure differential operated motor, said latter means comprising pneumatically operated means, together with the remainder of the power means, so constructed and arranged as to be operative, when the gaseous pressure within a compartment of the motor reaches a predetermined factor, to actuate said throttle operating mechanism to open the throttle.

12. In a suction operated motor for the power operation of an automotive clutch, a suction cylinder, a piston operable therein, slide valve means for controlling the application of suction to one side of said cylinder, an auxiliary resiliently expansible chamber connected to the other side of said cylinder, said slide valve further comprising means, when the valve is in an intermediate position, for venting the suction side of the suction cylinder to atmosphere, and for sealing said resiliently expansible chamber, and with means, when in a final position, for venting both the suction side of the suction cylinder and the resiliently expansible chamber to atmosphere.

VICTOR W. KLIESRATH.